(12) United States Patent
Park et al.

(10) Patent No.: US 9,422,178 B2
(45) Date of Patent: Aug. 23, 2016

(54) WASTEWATER TREATMENT SYSTEM TO REDUCE SLUDGE GENERATION

(75) Inventors: Chul Park, Amherst, MA (US); Dong-Hyun Chon, Amherst, MA (US)

(73) Assignee: UNIVERSITY OF MASSACHUSETTS, Boston, MA (US)

( * ) Notice: Subject to any disclaimer, the term of this patent is extended or adjusted under 35 U.S.C. 154(b) by 598 days.

(21) Appl. No.: 13/382,101

(22) PCT Filed: Jun. 16, 2010

(86) PCT No.: PCT/US2010/038749
§ 371 (c)(1),
(2), (4) Date: Mar. 6, 2012

(87) PCT Pub. No.: WO2010/148044
PCT Pub. Date: Dec. 23, 2010

(65) Prior Publication Data
US 2012/0152812 A1    Jun. 21, 2012

Related U.S. Application Data

(60) Provisional application No. 61/187,403, filed on Jun. 16, 2009.

(51) Int. Cl.
*C02F 3/12*      (2006.01)
*C02F 3/30*      (2006.01)
(Continued)

(52) U.S. Cl.
CPC ............... *C02F 3/1221* (2013.01); *C02F 3/308* (2013.01); *C02F 1/302* (2013.01); *C02F 1/34* (2013.01); *C02F 1/36* (2013.01); *C02F 1/46* (2013.01); *C02F 3/2813* (2013.01); *C02F 11/18* (2013.01); *Y02E 50/343* (2013.01); *Y02W 10/12* (2015.05); *Y02W 10/15* (2015.05)

(58) Field of Classification Search
USPC ......... 210/605, 607, 612–613, 620–621, 623, 210/625, 630
See application file for complete search history.

(56) References Cited

U.S. PATENT DOCUMENTS 4,397,953 A * 8/1983 Guazzone et al. ............ 435/243
4,675,114 A * 6/1987 Zagyvai et al. ............... 210/666
(Continued)

FOREIGN PATENT DOCUMENTS

KR    10-1995-0008039 B1    7/1995
KR         10-0758697 B1    9/2007
KR    10-2008-0025596 A     3/2008

OTHER PUBLICATIONS

Written Opinion of the ISA (Feb. 23, 2011).
(Continued)

*Primary Examiner* — Chester Barry
(74) *Attorney, Agent, or Firm* — Milstein Zhang & Wu LLC; Joseph B. Milstein

(57) ABSTRACT

The systems and methods described provide for reducing sludge generation, and thus sludge wasting and handling, by including an anaerobic completely stirred tank reactor (CSTR) as a bioreactor in a side-stream. The CSTR provides a significant simplification of side-stream treatment design, enhanced sludge minimization, and enhanced removal of nitrogen and phosphorous without the need to add organic carbon. The described systems and methods provide generation of biogas including both hydrogen and methane from the activated sludge system. The described systems and methods avoid complex reactor designs for nutrient removal.

17 Claims, 11 Drawing Sheets

(51) Int. Cl.

| | |
|---|---|
| C02F 1/30 | (2006.01) |
| C02F 1/34 | (2006.01) |
| C02F 1/36 | (2006.01) |
| C02F 1/46 | (2006.01) |
| C02F 3/28 | (2006.01) |
| C02F 11/18 | (2006.01) |

(56) References Cited

U.S. PATENT DOCUMENTS

| | | | | |
|---|---|---|---|---|
| 4,999,111 | A * | 3/1991 | Williamson | 210/605 |
| 5,593,892 | A * | 1/1997 | Wojciechowski et al. | 436/34 |
| 5,853,588 | A * | 12/1998 | Molof et al. | 210/605 |
| 6,106,717 | A * | 8/2000 | Hasegawa et al. | 210/607 |
| 7,172,699 | B1 * | 2/2007 | Trivedi et al. | 210/605 |
| 7,651,614 | B2 * | 1/2010 | Kelsey et al. | 210/607 |
| 7,993,522 | B2 * | 8/2011 | Curtis et al. | 210/605 |
| 8,093,041 | B1 * | 1/2012 | Nirmalakhandan et al. | 435/292.1 |
| 2006/0249448 | A1 * | 11/2006 | Fujishima et al. | 210/602 |
| 2007/0051677 | A1 | 3/2007 | Curtis et al. | |
| 2009/0272689 | A1 * | 11/2009 | Ladouceur | 210/615 |
| 2010/0032370 | A1 * | 2/2010 | Allen et al. | 210/603 |
| 2010/0036187 | A1 * | 2/2010 | Gunther | B01D 53/1425 585/802 |
| 2010/0206807 | A1 * | 8/2010 | Ripley | C02F 3/28 210/603 |
| 2011/0003357 | A1 * | 1/2011 | Barclay | A01G 33/00 435/167 |
| 2011/0197640 | A1 * | 8/2011 | Harman | B01D 53/02 71/23 |

OTHER PUBLICATIONS

International Search Report (Feb. 23, 2011).

* cited by examiner

Activated sludge + Mesophilic Anaerobic Digestion

UMass Anaerobic and Aerobic Sequential Sludge Reduction Process

WASTEWATER TREATMENT SYSTEM TO REDUCE SLUDGE GENERATION

CROSS-REFERENCE TO RELATED APPLICATIONS

This application claims priority to and the benefit of U.S. provisional patent application Ser. No. 61/187,403, filed Jun. 16, 2009 which application is incorporated herein by reference in its entirety.

FIELD OF THE INVENTION

The invention relates to systems and methods for wastewater treatment in general and particularly to sludge treatment systems and methods that enable minimized sludge generation, reduction of effluent nutrients, and production of bio-hydrogen by employing a single side-stream anaerobic completely-stirred-tank reactor (CSTR).

BACKGROUND OF THE INVENTION

Wastewater treatment plants (WWTPs) are ubiquitous. The treatment of sludge biomass, a microbial byproduct of biological wastewater treatment, is the most costly process in operation of wastewater treatment plant. The vast majority of WWTPs use an activated sludge process. Wastewater is broken down by microbes in an aeration basin. This leads to growth and accumulation of biomass (multiplying bacteria and broken down organics) which tends to aggregate in clumps. The next step is a separation of the biomass from the treated effluent water using settling tank (clarifier) or membrane filtration system. The membrane system can exist in the main aeration basin or outside the aeration basin as an individual membrane bioreactor. The separate water is then further purified and released to receiving water bodies.

Some of this settled or unfiltered sludge is routed back to the main aeration basin to maintain an optimal level of bacteria. A significant portion of sludge has to be removed from the system and discarded. The treatment and disposal of this bio-hazardous sludge is estimated to account for 50-60% of the operating costs of a WWTP. Excess sludge is treated by a series of processes that include sludge thickening, conditioning and dewatering. It is then either transported to a landfill or incinerated. All these steps require much energy and efforts to meet the regulations. The excess sludge can also be processed using aerobic or anaerobic digestion. The digested sludges, however, still require conditioning, dewatering, and final disposal.

Conventional sludge treatments such as incineration or heat drying of sludge face significant challenges due to increased fuel prices and elevated concerns in air pollution.

Siemens Water Technologies has developed an improved wastewater treatment system called Cannibal™. The main innovation is a side-stream reactor that breaks down the excess sludge and greatly reduces the need to treat and dispose of it. The Cannibal™ side-stream reactor provides anoxic, anaerobic conditions, and has remote sensors that monitor the oxidation-reduction potential at different levels/compartments of the side reactor. The Cannibal™ system is described in U.S. Patent Application Publication 2007/0051677, "Screening of inert solids from a low-yield wastewater treatment process," assigned to Siemens Water Technologies.

Other United States Patents that are of interest include U.S. Pat. Nos. 5,976,365, 5,766,491, 5,766,484, 5,538,635, 5,454, 938, 5,411,660, 5,372,712, 5,296,201, and 5,296,200, assigned to Envirex (which is owned by Siemens).

As a consequence, finding technologies or processes that can lead to low sludge yield from the treatment systems (reduction of excess sludge generation) is an extremely important issue and has significant commercial potential.

There is a need for improved wastewater treatment systems and methods that further reduce the sludge wastage.

SUMMARY OF THE INVENTION

According to one aspect, the invention relates to a wastewater treatment reactor. The wastewater treatment reactor comprises a tank reactor configured for side-stream connection to a wastewater treatment facility, the tank reactor having an input port and at least one output port, the tank reactor configured to provide an anaerobic reaction environment, the tank reactor configured to provide a completely stirred reaction environment, and the tank reactor configured to provide a controlled solids retention time (SRT).

In some embodiments, the tank reactor is additionally configured to provide a controlled reaction temperature. In some embodiments, the input port is in fluid connection with a settling tank. In some embodiments, the settling tank precedes an aerobic reactor in a main treatment stream of the wastewater treatment facility. In some embodiments, the settling tank follows an aerobic reactor in a main treatment stream of the wastewater treatment facility.

In some embodiments, the input port is in fluid connection with a membrane bioreactor. In some embodiments, the input port is in fluid connection with a sludge line from a sludge pretreatment unit.

In some embodiments, the at least one output port is in fluid connection with an input port of a reactor in a main treatment stream of the wastewater treatment facility. In some embodiments, the at least one output port in fluid connection with an input port of a reactor in a main treatment stream of the wastewater treatment facility is in fluid connection with an aerobic reactor in the main treatment stream. In some embodiments, the at least one output port in fluid connection with an input port of a reactor in a main treatment stream of the wastewater treatment facility is in fluid connection with an anoxic reactor in the main treatment stream. In some embodiments, the anoxic reactor is configured to accept effluent from the tank reactor and in response thereto, to reduce a nitrogen content of an effluent of the wastewater treatment facility.

In some embodiments, the at least one output port in fluid connection with an input port of a reactor in a main treatment stream of the wastewater treatment facility is in fluid connection with an anaerobic reactor in the main treatment stream. In some embodiments, the anaerobic reactor is configured to accept effluent from the tank reactor and in response thereto, to reduce a phosphorus content of an effluent of the wastewater treatment facility.

In some embodiments, the at least one output port is configured to provide waste sludge as output. In some embodiments, the tank reactor is configured to provide hydrogen gas as output. In some embodiments, the tank reactor is configured to provide methane gas as output.

In some embodiments, the tank reactor is configured to permit deliberately added material to be introduced to the wastewater stream. In some embodiments, the deliberately added material is a chemical.

In some embodiments, the tank reactor is configured to permit additional side-stream treatment for enhanced sludge reaction in the tank reactor.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION

Figure 1:
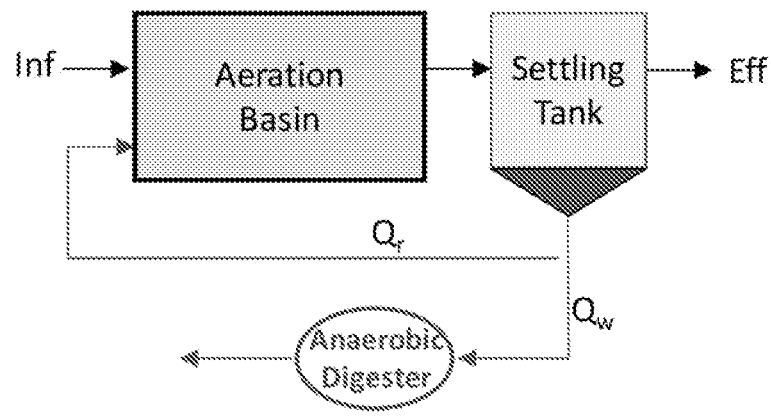
FIG. 1 is a schematic diagram of a conventional activated sludge process with anaerobic digestion.
Figure 2:
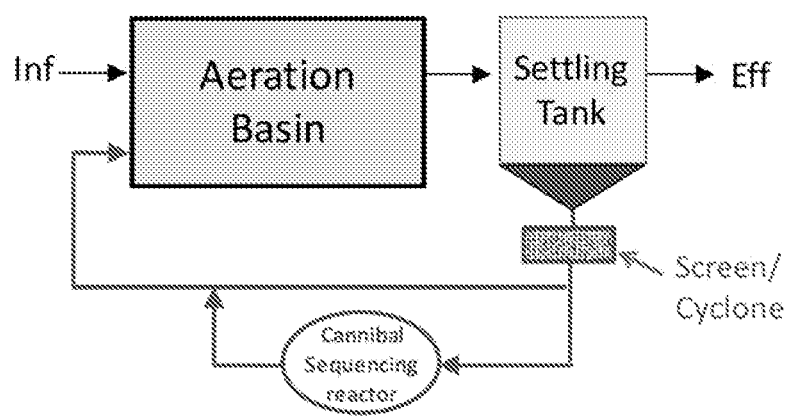
FIG. 2 is a schematic diagram of the Siemens Cannibal process.
Figure 3:
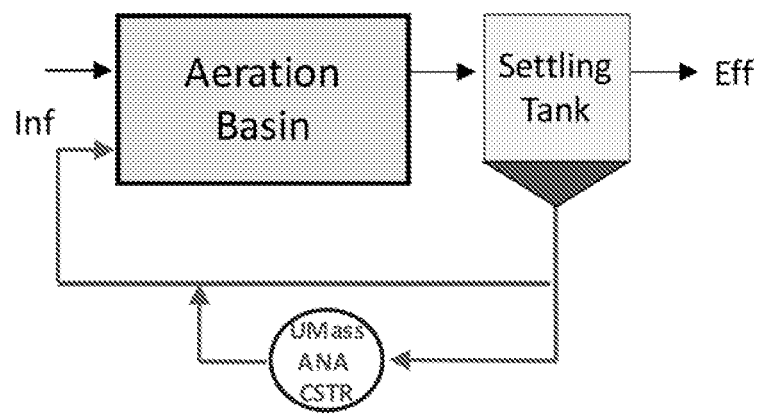
FIG. 3 is a schematic diagram of the invented process.
Figure 4:
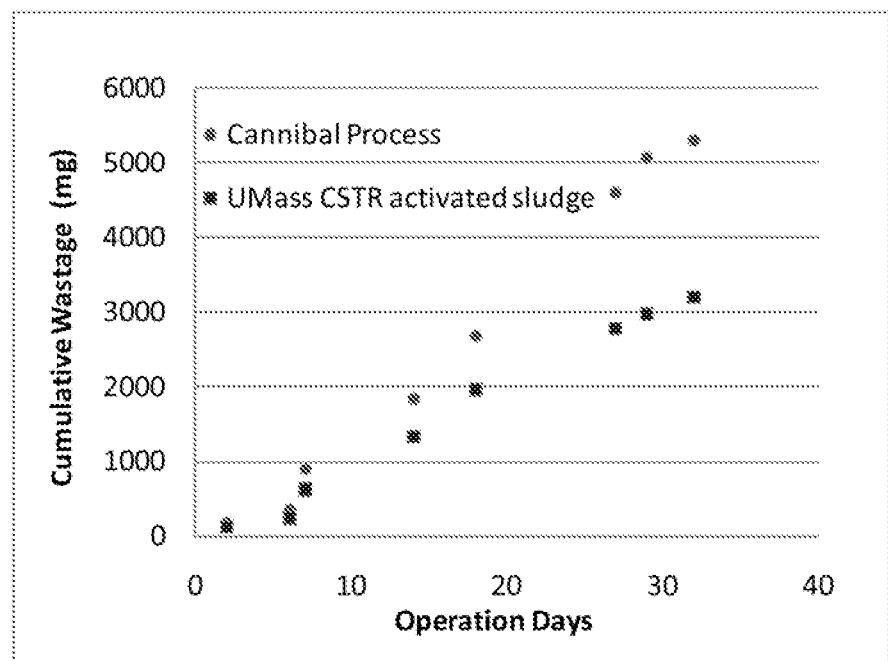
FIG. 4 is a graph showing a comparison of the accumulated wastage of activated sludge in the laboratory Cannibal system (10 day SRT) and the system of the present invention (2 day SRT).
Figure 5:
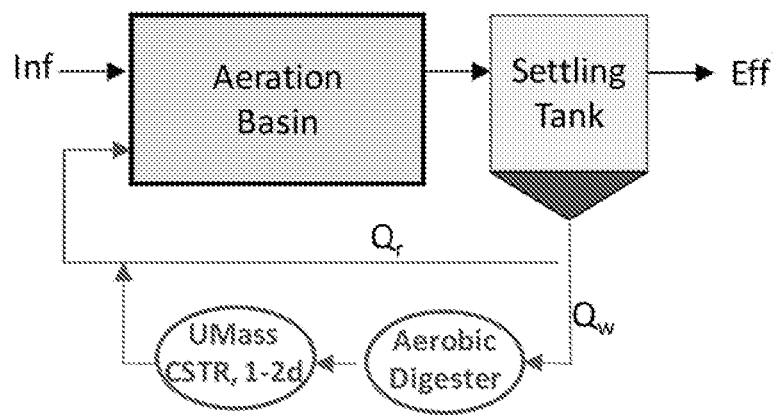
FIG. 5 is a diagram illustrating a sludge digestion system (and associated process) comprising both aerobic and anaerobic reactors.

The invention relates to the technology for reducing sludge generation in wastewater treatment plants. In one embodiment, the systems and methods of the invention leads to extremely low sludge yield, thus allowing significantly reduced sludge wasting from the wastewater treatment systems. The systems and methods of the invention also permit reduction of nitrogen and phosphorous in effluent without the addition of external organic carbon or without requirement of a complex reactor design such as pre-denitrification with mixed liquor recirculation. The systems and methods of the invention also provide for generation of hydrogen from the anaerobic bioreactor which can be used as an energy source for the facility.

In another aspect, the systems and methods of the invention feature an external anaerobic hydrolysis and fermentation bioreactor that treats excess sludge and returns it back to the main wastewater reaction basin. The tank reactor is operationally within the loop of the activated sludge process.

A new side-stream, anaerobic, Completely Stirred Tank Reactor (CSTR) has been developed that is easy to install and operate in wastewater treatment plants as compared to the Cannibal system. This reactor facilitates conditions and microbial breakdown pathways that are very different from the Cannibal process. The enhanced sludge reduction with minimized sludge wasting (see attached lab simulation results) also permits no need of physical separation modules for this sludge reduction system. The tank reactor helps create an acidic, anaerobic environment that is conducive to deflocculation (the separation of biomass clumps) and sludge hydrolysis, further encouraging breakdown of sludge.

The present system has several advantages over the Cannibal system. The CSTR is smaller than the Cannibal's sequencing digester and is of a robust and simple design. The hydraulic retention time (HRT) and solids retention time (SRT) are same in the systems and methods of the invention. The SRT needs to be very short (less than 4 days), allowing the adoption of a small anaerobic CSTR in the side-stream. By comparison, the Cannibal Process has SRT of about 10 days duration (Goel and Noguera, 2006; Novak et al., 2007; Johnson et al., 2008). It also requires a sequencing type reactor to decouple the SRT from the HRT in a side-stream tank reactor. If a simple CSTR type reactor is to be used in the Cannibal process, the reactor would need to be huge to sustain a long SRT. The short SRT in the presently described system is feasible because anaerobic hydrolysis of sludge is accelerated by acidic conditions selected in the anaerobic CSTR, and hydrolyzed and partially fermented sludge is mainly degraded in the aeration basin or other reaction basins in the main stream of wastewater treatment facility.

The reduction of the size of the reactor and operation of this side-stream tank reactor CSTR is a significant development and is expected to lead to substantial capital cost reduction and operating cost savings as compared to the Cannibal system.

The invented anaerobic tank reactor can be maintained at ambient temperature. The CSTR can also be operated under any temperatures in the range of about 15° C. to about 60° C.

The CSTR is a closed tank reactor that is expected to maintain an anaerobic environment for its operation.

This system can be tailored to produce $H_2$, which can be used as an energy source for the facility. The anaerobic CSTR with short SRT and continuous recirculation of sludge between main stream and side-stream reactors enhance selective generation of $H_2$. Production of CH4 can be accomplished by the action of methanogenic microorganisms in the CSTR.

Unless another meaning is clear from the text (e.g., membrane bioreactor), the term "bioreactor" is intended to denote the side-stream tank reactor connected to the main aeration basin or other main reaction basins where most sewage degradation occurs.

The bioreactor is a closed, anaerobic CSTR which has solids retention time less than 4 days.

The sludge treated in this anaerobic CSTR returns to the main aeration basin or other main reaction basins in the activated sludge system or the membrane bioreactor (main reactor) for reduced sludge generation.

Very small amounts of wasting can occur from the waste stream from the bioreactor to avoid the accumulation of inorganic compounds.

A significant feature of this invention is the anaerobic CSTR that will select biochemical and biological conditions that will be favorable for speeding up anaerobic hydrolysis and fermentation of waste sludge. In some embodiments, no additional deliberately added chemicals or biological materials need to be added to the waste stream. As may be helpful or appropriate, any additional physical or chemical pretreatment methods such as sonication, thermal treatment (e.g., microwave, etc), mechanical shear, and electrolysis can take place prior to the addition of sludge into the anaerobic CSTR, although the major sludge reduction should come from recirculation of sludge via a short SRT anaerobic CSTR.

In addition to chemical and/or physical sludge pretreatment (treatment of sludge before it enters the CSTR), other enhancement methods using physical, chemical, and/or biological treatments can be directly applied to the contents inside the CSTR. These enhancements can occur inside the CSTR reactor or by making the enhancements to the sludge as it is pumped outside the CSTR. These enhancement methods may include addition of chemicals such as bases, addition of digesting enzymes, sonication treatment, treatment with ozone or other oxidizing chemical treatments, and thermal treatment of sludge.

The anaerobic side-stream reactor is preferably a completely mixed tank reactor with solids retention time (microbial retention time) smaller than 4 days.

Feeding and wasting of this bioreactor can take place in either continuous mode or in intermittent mode. For a continuous mode, this bioreactor is operated in a chemostat fashion so that feeding and wasting should happen at an identical rate in a continuous flow. For an intermittent mode operation, feeding and wasting happen intermittently (e.g., once a day or a few times per week) but still at an identical rate. In either case, solids retention time and hydraulic retention time are identical for this CSTR.

The feeding of sludge for this bioreactor can come either from the bottom of secondary clarifier or from the return sludge line. Different portions of sludge can be treated in this bioreactor and returned into the main aeration basin or other main reaction basins. However, 10-50% of total sludge mass (in settled or thickened sludge) can pass through this CSTR either in continuous mode or intermittent mode, as stated above. If the main wastewater treatment system is a membrane bioreactor, sludge to be treated can come from the membrane bioreactor or also from the return sludge line.

Figure 6:
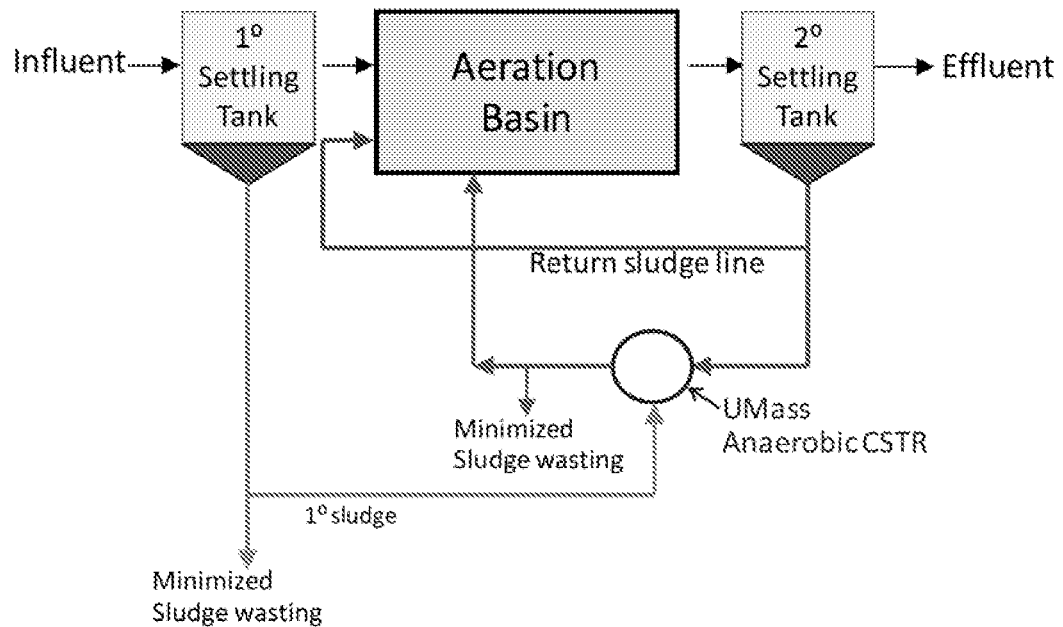
FIG. 6 is a schematic of diagram of the invented process additionally digesting primary sludge.

For an activated sludge system with primary clarification, some of primary sludge can also be treated in this bioreactor. See FIG. 6. Addition of these primary sludges in this CSTR will help develop acidic anaerobic environment.

To treat primary sludge in the CSTR, the CSTR can have two main inlets: one for secondary sludge and the other for primary sludge or it can have a single inlet for blended sludge (i.e., primary sludge combined with secondary sludge).

Wasting of sludge from this bioreactor will mostly return to the main aeration basin or other main reaction basins for further degradation under aerobic, anoxic, or anaerobic conditions in which major sewage degradation occurs.

Figure 7:
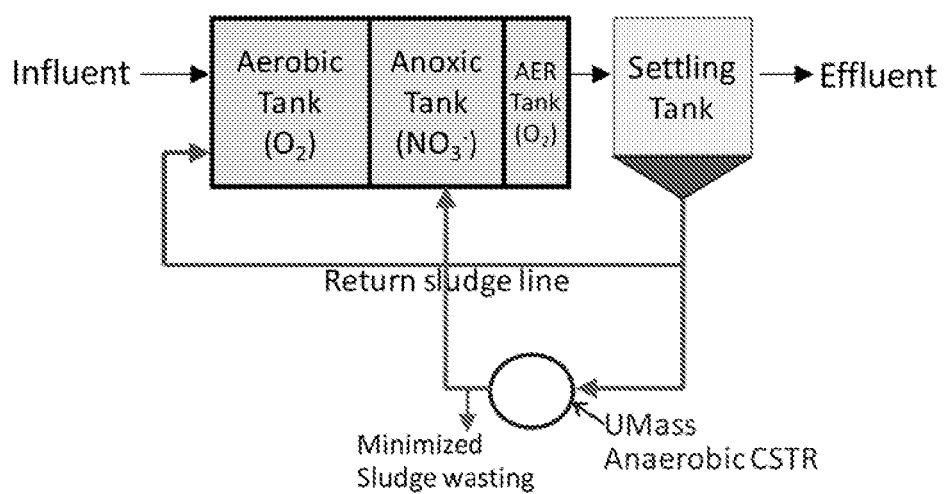
FIG. 7 is a schematic diagram of a first embodiment of the sludge reduction process having an anoxic tank in the main stream that is configured for additional nitrogen removal from the wastewater effluent.
Figure 8:
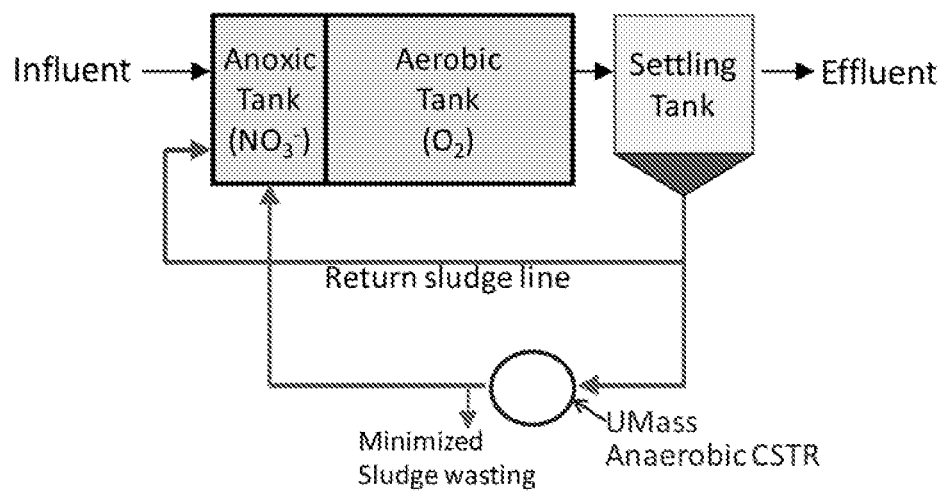
FIG. 8 is a schematic diagram of a second embodiment of the sludge reduction process having an anoxic tank in the main stream that is configured for additional nitrogen removal from the wastewater effluent.

Wasting of sludge from the bioreactor can return to the anoxic tank reactor (either to a first tank or to a second tank) in the main stream to enhance removal of nitrogen via denitrification. Hydrolyzed sludge organics from the bioreactor will serve as an organic source for denitrification, and it is expected that no additional source of carbon will be required. See FIG. 7 and FIG. 8.

Figure 9:
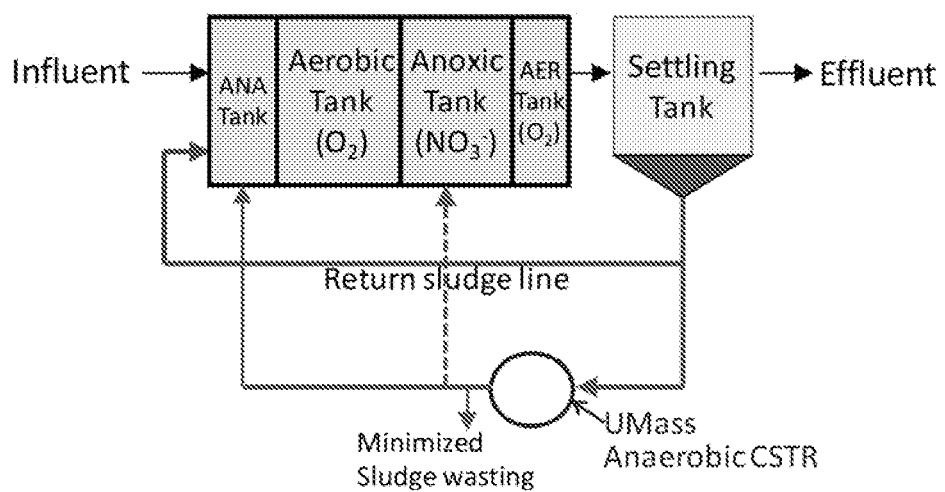
FIG. 9 is a schematic diagram of the sludge reduction process having a first anaerobic tank in the main stream for additional phosphorous and nitrogen removal.
Figure 10:
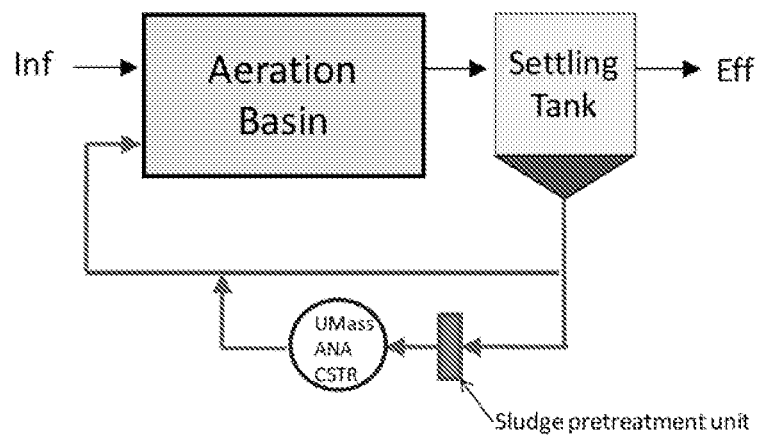
FIG. 10 is a schematic diagram of the sludge reduction process with the CSTR receiving pretreated sludge.
Figure 11:
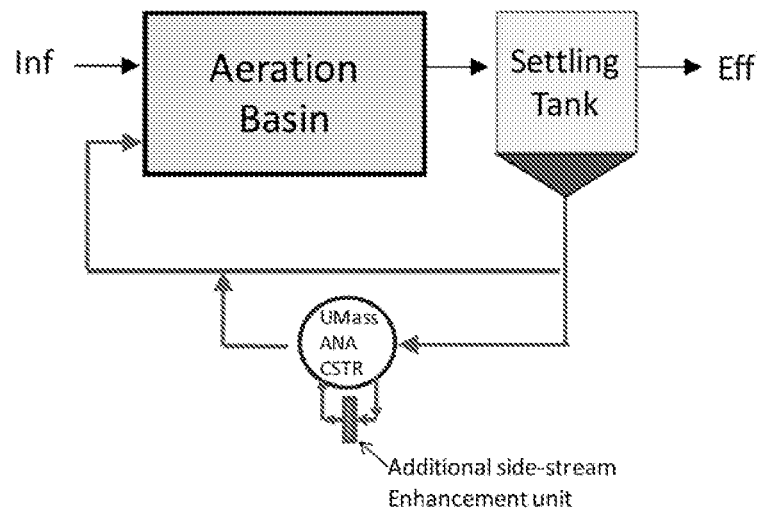
FIG. 11 is a schematic diagram of the sludge reduction process that incorporates additional side-stream treatment for enhanced sludge treatment in the CSTR.

Wasting of sludge from the bioreactor can return to the anaerobic tank reactor (the first tank) in the main stream to enhance removal of phosphorous. Hydrolyzed sludge organics from the bioreactor will serve as organic source for organic carbon uptake simultaneously with phosphorous release in this anaerobic tank reactor. See FIG. 9.

The anaerobic CSTR requires mixing and the mixing can be provided by various ways of physical mixing inside the reactor, such as mechanical stirring.

System Operation

Five activated sludge systems with different side-stream digestion schemes were operated in the laboratory to investigate the UMass sludge reduction process and to compare its efficiency against biological sludge reduction conditions used in the Cannibal solids reduction process.

The following acronyms (with their full descriptions as shown below) are used to describe the five systems that were investigated.

AS: activated sludge
AER: aerobic
ANA: anaerobic
COD: chemical oxygen demand
CSTR: completely stirred tank reactor
MLSS: mixed liquor suspended solids
SRT: solids retention time
SSR: side-stream reactor
UMass: University of Massachusetts Amherst
VSS: volatile suspended solids

Operation of Activated Sludge Reactors

The five activated sludge systems that were investigated are identified as in Table I.

TABLE I

| System number | System Description |
|---|---|
| 1 | AS + SSR: long SRT (10 day) ANA CSTR at 21° C. |
| 2 | AS + SSR: UMass short SRT (2.5 day) ANA CSTR at 21° C. |
| 3 | AS + SSR: UMass short SRT (2.5 day) ANA CSTR at 37° C. |
| 4 | AS + SSR: UMass short SRT (2.5 day) ANA CSTR at 50-55° C. |
| 5 | Control AS without SSR |

Figures 12A, 12B, 12C:
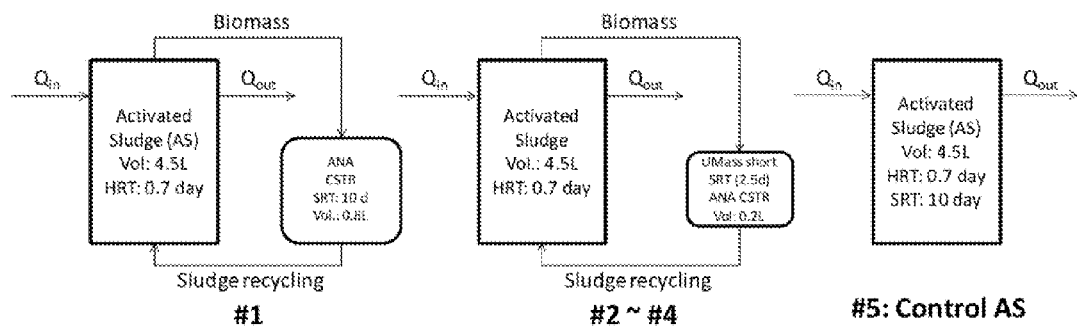
FIG. 12A through FIG. 12C are diagrams illustrating schematically five activated sludge systems that were operated as described hereinbelow. Systems 2, 3, and 4 included a CSTR operated at temperatures of 21° C., 37° C., and 50-55° C., respectively.

FIG. 12A through FIG. 12C shows a schematic of the five reactor setups that were investigated. The systems were operated for more than 100 days. Real wastewater (primary effluent from Amherst Wastewater Treatment Plant, Amherst, Mass.) was used as a feed to all five activated sludge systems. For convenience, a sequencing batch reactor (SBR) was used to operate a main AS reaction basin. For systems 1 to 4, 10% volume of sludge in SBR (i.e., 0.45 L of AS) was wasted, thickened (0.45 L to 0.8 L), and fed to their respective SSRs. Prior to feeding, the same volume of ANA sludge was taken from each SSR and most of that material was recycled back to a main AS reactor while about 10% of ANA sludge was removed for sampling and wastage purposes. System 5 served as a control activated sludge for four systems with SSRs. This system, therefore, did not include a SSR and 10% volume (mass) of sludge in the main AS reactor was permanently wasted to maintain the SRT of the AS at 10 days. The collected or wasted sludge was used to measure sludge yield from each system. Influent and effluent COD was also determined in order to calculate sludge yield.

Profile of Solids Concentrations in the Main as Reactor and SSR

Figure 13:
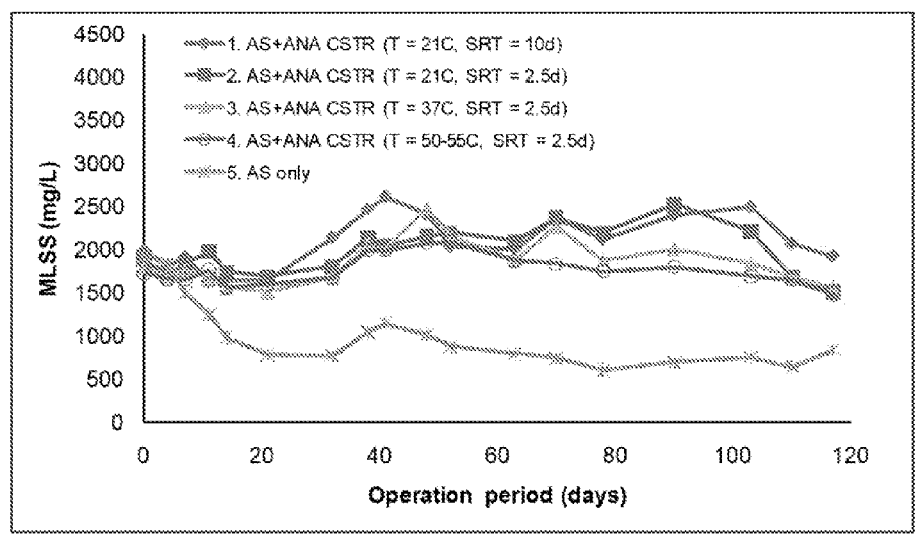
FIG. 13 is a diagram showing mixed liquor suspended solids (MLSS) concentrations in five activated sludge (AS) systems during 117 days of operation.

FIG. 13 shows MLSS concentrations in five AS systems during 117 days of operation. At the beginning of operation, MLSS was around 2,000 mg/L for all five systems. System 5 (control AS) was maintained at 10 day SRT for activated sludge and a continuous sludge wasting was allowed to maintain this SRT, which led to decrease in MLSS concentration at around 700 mg/L. Systems 1 to 4 had minimized sludge wasting to operate these systems under sludge reduction mode. As the data shows, MLSS concentrations in these systems remained fairly constant throughout the operation indicating that the systems were stable.

Figure 14:
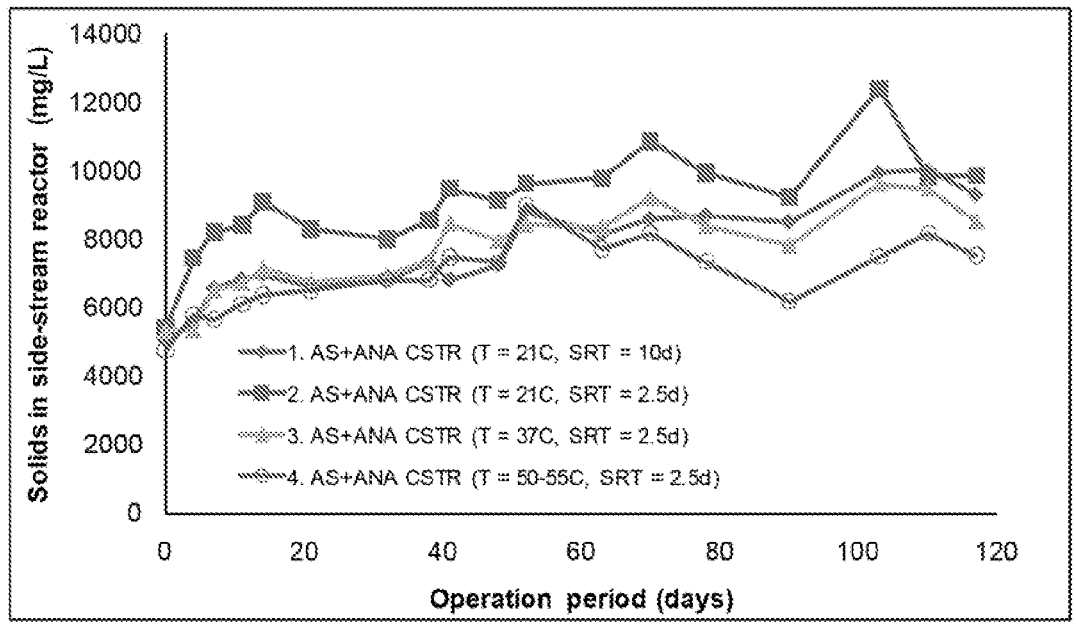
FIG. 14 is a diagram showing the solids concentrations of anaerobic side-stream reactors over time.

Solids concentrations of ANA SSRs are shown in FIG. 14. Initially solids were built up in each ANA SSR; however, approximately after 30 days of operation, solids concentrations in each ANA SSR also became relatively stable indicating that the operation was effective and stable.

Sludge Yield

Figure 15:
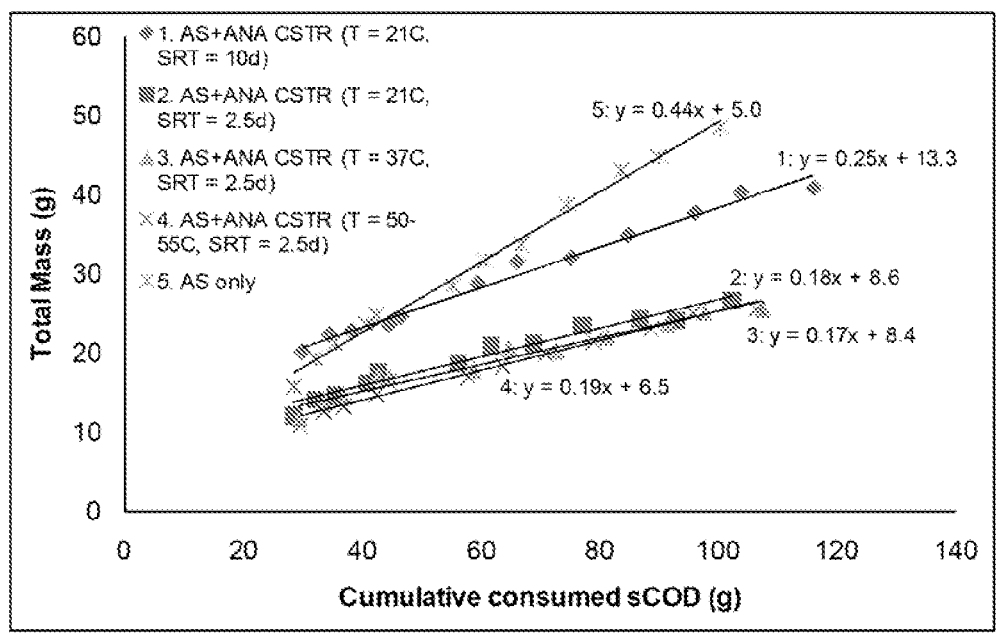
FIG. 15 is a diagram showing the total mass of anaerobic side-stream reactors versus consumed soluble chemical oxygen demand.

Overall sludge yield is the most important parameter that determines the efficiency of sludge reduction in each AS system. A graphical method was used to determine the observed yield of sludge in each system as shown in FIG. 15. The Y-axis (gram VSS) designates "total mass" which includes the mass of sludge in the main AS reactor, ANA SSR, and from cumulative solids wastage via effluent and intentional sampling. The X-axis (gram sCOD) represents "cumulative consumed soluble COD" in each system. The definition of yield is the amount of biomass generated per amount of substrate consumed so the slope of each linear regression line should be the observed yield of each system.

As the data in FIG. 15 shows, the overall observed yields for systems 1, 2, 3, 4, 5 were 0.25, 018, 0.17, 0.19, and 0.44 g VSS/g COD, respectively. This data is summarized in Table 2.

TABLE 2

| System number | System Description | Observed solids yield (g VSS/g COD) |
|---|---|---|
| 1 | AS + SSR: long SRT (10 day) ANA CSTR at 21° C. | 0.25 |

TABLE 2-continued

| System number | System Description | Observed solids yield (g VSS/g COD) |
|---|---|---|
| 2 | AS + SSR: UMass short SRT (2.5 day) ANA CSTR at 21° C. | 0.18 |
| 3 | AS + SSR: UMass short SRT (2.5 day) ANA CSTR at 37° C. | 0.17 |
| 4 | AS + SSR: UMass short SRT (2.5 day) ANA CSTR at 50-55° C. | 0.19 |
| 5 | Control AS without SSR | 0.44 |

As the data shows, System 3 (AS+SSR: UMass short SRT (2.5 day) ANA CSTR at 37° C.) led to the lowest sludge yield but overall yield was very similar for all three UMass sludge reduction systems (systems 2-4). Based on these yield values, systems 2-4 showed 59%, 62%, and 58% reduction compared to a control AS (system 5), respectively. Furthermore, systems 2-4 showed about 30% more solids reduction than system 1. These results clearly indicate that the UMass sludge reduction system that employs a short SRT ANA CSTR as a SSR is very effective in reducing sludge generation and is even more effective than sludge reduction conditions used in System 1 that had a long SRT. This 10 day SRT is a typical SRT conditions used in the Cannibal process.

Biogas Generation from Anaerobic Side-Stream Reactors

Figure 16:
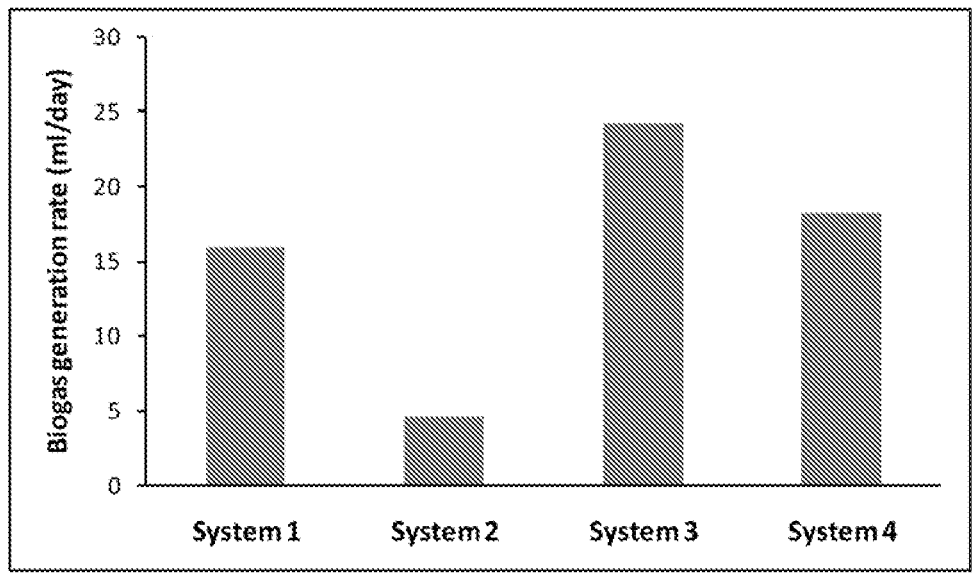
FIG. 16 is a diagram showing biogas generation rate for four side-stream reactors (SSRs) in systems 1-4.
Figure 17:
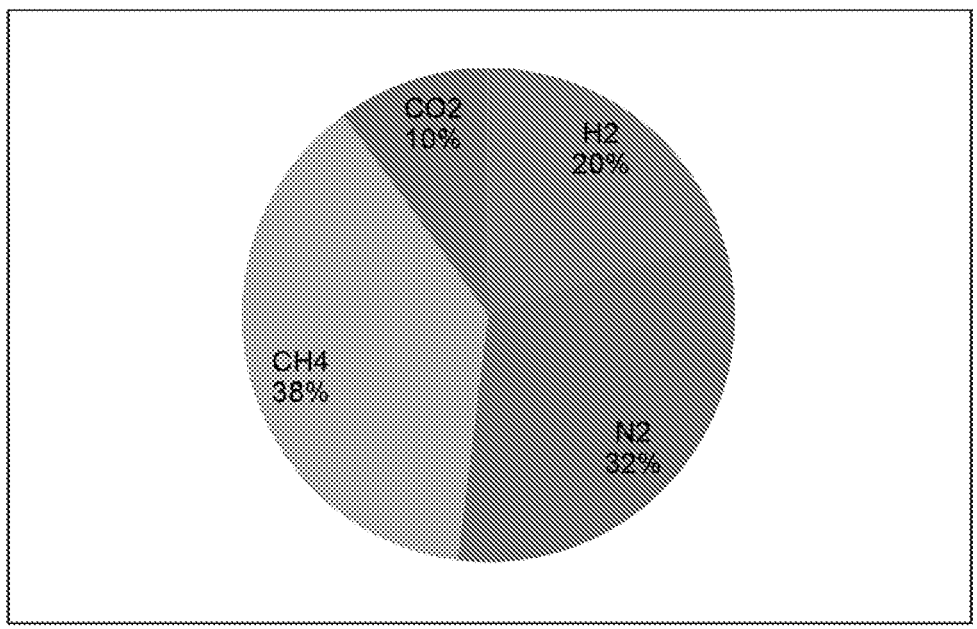
FIG. 17 is a diagram showing biogas composition in anaerobic side-stream reactor of system 3 (day 63-day 78).

The biogas generation rate data is shown in FIG. 16. This data was obtained by dividing the total volume of gas generated from ANA SSR by total operation time. As the data shows, SSR in system 3 (UMass ANA CSTR at 37° C.) produced the largest volume of biogas. In particular, much of gas in this system was generated during day 60 to day 100. During this operation we also observed that hydrogen ($H_2$) gas was produced in system 3 at about 20% of total gas volume, as shown in FIG. 17. This is a substantially high value for $H_2$ in an ANA digester treating AS. This data suggests that System 3 has a great potential to generate high concentrations and amounts of bio-hydrogen. System 4 which used an even higher temperature of SSR generated less total biogas than did system 3 indicating that a large gas generation in system 3 is not merely due to simple digestion of waste sludge in SSR. ANA SSR in system 2 produced the smallest volume of biogas. SSR from system 1 produced a similar gas volume as did system 4.

Effluent Quality and Settling Properties

Figure 18:
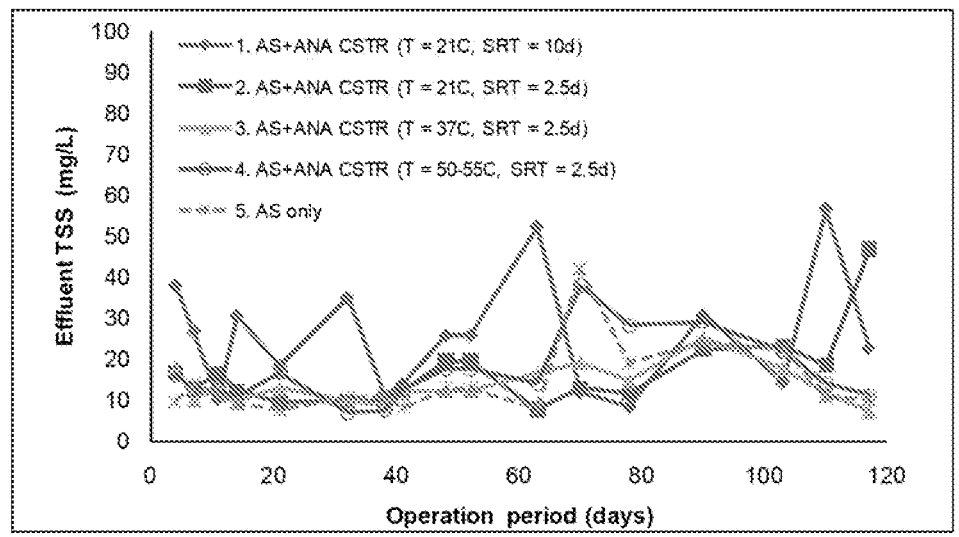
FIG. 18 is a diagram showing effluent total suspended solids from five activated sludge systems over time.
Figure 19:
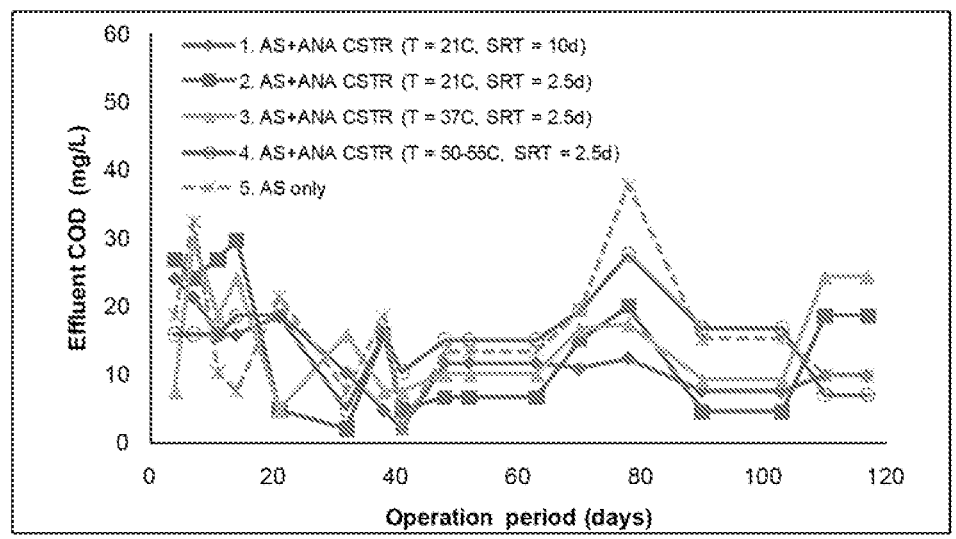
FIG. 19 is a diagram showing effluent soluble chemical oxygen demand from five activated sludge systems over time.

The benefit of sludge reduction should not compromise effluent quality which is a main goal of the activated sludge process. Hence, several parameters of sludge and effluent properties were measured during the study and these data are presented in FIG. 18 to FIG. 20. FIG. 18 first shows effluent TSS data over a period longer than 100 days of operation. As the data shows, effluent TSS of the UMass sludge reduction system (systems 2-4) were close to or occasionally even better than that of the control activated sludge system (System 5). System 1 which incorporated a long anaerobic SRT led to effluent TSS higher than other systems and frequently higher than 30 mg/L. These data indicate that the UMass sludge reduction process does not cause effluent problems. Effluent COD data shown in FIG. 19 also shows that all the systems led to quite low effluent COD indicating a good quality of effluent in terms of COD.

Figure 20:
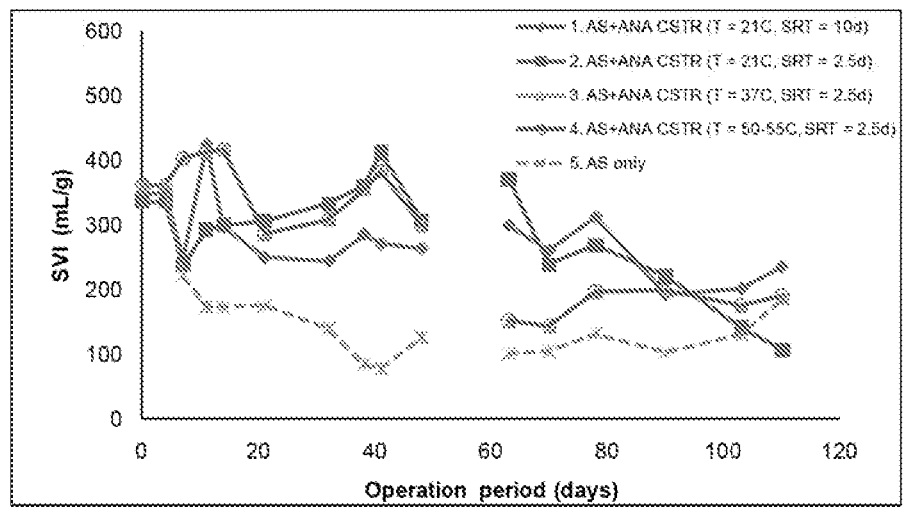
FIG. 20 is a diagram showing sludge volume index of MLSS in five activated sludge systems over time.

Sludge volume index (SVI) values were rather high for all four sludge reduction systems as shown in FIG. 20. This could be partly associated with poor settling of the seed sludge we used. As the data shows, the initial SVI from the seed AS was already more than 350 mL/g. Since minimized sludge wasting was allowed from the systems from 1-4, the settling properties did not improve quickly, although control AS (system 5) led to a quick decrease in SVI due to a continuous sludge wasting. With a longer operation of AS systems, the overall sludge settling property also was improved as shown with a decrease in SVI. Nevertheless, even with relatively high SVI during the early period of operation, effluent quality was good for systems from 2-4, as discussed above.

Microscopic Analysis

Figure 21:
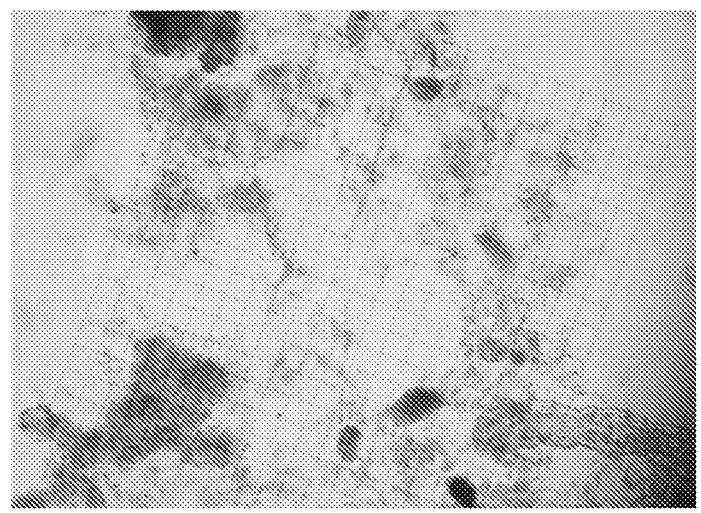
FIG. 21 is an image of flocs in activated sludge from system 3.

Microscopic analysis was conducted at the end of the operation. FIG. 21 is an example of microscopic observation of AS in system 3. There were not a high number of filamentous microorganisms in these sludges throughout the operation. Also AS samples did not contain red worms which were seen in previous studies that investigated sludge reduction under long SRT ANA SSR using a synthetic wastewater as a feed. The overall floc image was very similar to one from a conventional activated sludge system.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein, so long as at least some of the implementation is performed in hardware.

Any patent, patent application, or publication identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A wastewater treatment reactor, comprising:
    a tank reactor configured for side-stream connection to a wastewater treatment facility,
        said tank reactor having an input port and at least one output port,
    said tank reactor configured to provide an anaerobic reaction environment,
    said tank reactor configured to provide a completely stirred reaction environment, and
    said tank reactor configured to provide a controlled solids retention time (SRT) of 1 to 2.5 days—with the generation of gas comprising at least one of methane and hydrogen in proportions of 38% and 20% of the total generated gas, respectively.

2. The wastewater treatment reactor of claim 1, wherein said tank reactor is additionally configured to provide a controlled reaction temperature.

3. The wastewater treatment reactor of claim 1, wherein said input port is in fluid connection with a settling tank.

4. The wastewater treatment reactor of claim 3, wherein said settling tank precedes an aerobic reactor in a main treatment stream of said wastewater treatment facility.

5. The wastewater treatment reactor of claim 3, wherein said settling tank follows an aerobic reactor in a main treatment stream of said wastewater treatment facility.

6. The wastewater treatment reactor of claim 1, wherein said input port is in fluid connection with a membrane bioreactor.

7. The wastewater treatment reactor of claim 1, wherein said input port is in fluid connection with a sludge line from a sludge pretreatment unit.

8. The wastewater treatment reactor of claim 1, wherein said at least one output port is in fluid connection with an input port of a reactor in a main treatment stream of said wastewater treatment facility.

9. The wastewater treatment reactor of claim 8, wherein said at least one output port in fluid connection with an input port of a reactor in a main treatment stream of said wastewater treatment facility is in fluid connection with an aerobic reactor in said main treatment stream.

10. The wastewater treatment reactor of claim 8, wherein said at least one output port in fluid connection with an input port of a reactor in a main treatment stream of said wastewater treatment facility is in fluid connection with an anoxic reactor in said main treatment stream.

11. The wastewater treatment reactor of claim 10, wherein said anoxic reactor is configured to accept effluent from said tank reactor and in response thereto, to reduce a nitrogen content of an effluent of said wastewater treatment facility.

12. The wastewater treatment reactor of claim 8, wherein said at least one output port in fluid connection with an input port of a reactor in a main treatment stream of said wastewater treatment facility is in fluid connection with an anaerobic reactor in said main treatment stream.

13. The wastewater treatment reactor of claim 12, wherein said anaerobic reactor is configured to accept effluent from said tank reactor and in response thereto, to reduce a phosphorus content of an effluent of said wastewater treatment facility.

14. The wastewater treatment reactor of claim 1, wherein said at least one output port is configured to provide waste sludge as output.

15. The wastewater treatment reactor of claim 1, wherein said tank reactor is configured to permit deliberately added material to be introduced to the wastewater stream.

16. The wastewater treatment reactor of claim 15, wherein said deliberately added material is a chemical.

17. The wastewater treatment reactor of claim 1, wherein said tank reactor is configured to permit additional sidestream treatment for enhanced sludge reaction in said tank reactor.

* * * * *